United States Patent [19]

Lutz

[11] 4,049,231

[45] Sept. 20, 1977

[54] MOLD FOR MANUFACTURING AN INTEGRALLY MOLDED BALL AND SOCKET TYPE HINGE

[76] Inventor: Michael Lutz, 226 High Tor Drive, Watchung, N.J. 07060

[21] Appl. No.: 647,088

[22] Filed: Jan. 7, 1976

[51] Int. Cl.² .............................................. B29C 11/00
[52] U.S. Cl. ...................................... 249/64; 249/119; 425/438; 425/588; 425/129 R; 425/DIG. 34; 249/98
[58] Field of Search ............... 425/110, 116, 117, 125, 425/126, 127, 128, 129 R, 317, 351, 438, DIG. 34; 249/117, 142, 144, 160, 67, 68, 64

[56] References Cited

U.S. PATENT DOCUMENTS

| | | | |
|---|---|---|---|
| 3,013,308 | 12/1961 | Armour | 425/242 X |
| 3,456,913 | 7/1969 | Lutz | 425/129 X |
| 3,477,095 | 11/1969 | Lensky | 249/68 X |

*Primary Examiner*—J. Howard Flint, Jr.

[57] ABSTRACT

An article having two sections which are articulated to one another by at least one hinge that includes a substantially spherical male hinge member disposed within a recess provided by a surface of a female hinge member. The hinge includes retaining means for confining the male hinge member within the recess while permitting rotational motion of the male hinge member within the recess. The male member is a continuous molded extension of one section of the article and the female hinge member is a continuous molded extension of the other section of the article.

A mold for use in manufacturing the above-described article includes upper and lower mold sections which, when brought into mating relationship with each other, provide article section forming compartments adjacent to each other for forming the sections of the article. A female hinge member forming compartment communicates with one of the section forming compartments. A mold segment interrupts the female hinge member forming compartment. This mold segment includes walls having an outer periphery about which the recess in the female hinge member is formed, and an inner, substantially spherical periphery providing a male hinge member forming compartment. Slots extend through walls of the mold segment which interrupt the female hinge member forming compartment for communicating the female hinge member forming compartment with the substantially spherical male hinge member forming compartment. The retaining means for confining the male hinge member within the recess of the female hinge member are formed within these slots. An additional slot in the mold segment provides communication between the substantially spherical male hinge member forming compartment and the other article section forming compartment. From the above description it can be seen that a continuous passage for the flow of molding material is provided between the two article section forming compartments so that each part of the hinge is integrally formed with its respective article section, and with the substantially spherical male hinge member confined within the recess of the female hinge member.

13 Claims, 16 Drawing Figures

MOLD FOR MANUFACTURING AN INTEGRALLY MOLDED BALL AND SOCKET TYPE HINGE

BACKGROUND OF THE INVENTION

1. Field of the Invention

This invention relates to an article having two sections which are articulated together through a hinge, and to a mold for use in manufacturing the article. More specifically, this invention relates to a rigid article having two sections which are articulated together through a ball and socket-type hinge which is simultaneously molded with the sections of the article in an assembled and operative condition, and to a mold for use in manufacturing the article.

2. Description of the Prior Art

Rigid plastic containers including a two-piece hinge connecting a lid to a container body have many commercial applications. One specific application is in the bulk packaging of relatively small articles, such as nails, bolts, screws, nuts and the like. These containers have been displayed or stored in bins, or alternatively, have been provided with annular openings to permit them to be displayed or stored on supporting rods connected to a peg board or a similar supporting structure.

Until the advent of the invention disclosed in U.S. Pat. No. 3,456,913, issued on July 22, 1969 to the inventor of the subject matter of this invention, it was common practice to mold one portion of a two-piece hinge with the body of the container and the other portion of the hinge with the lid of the container. However, the two pieces of the hinge were not molded in an engaged and operative condition. Accordingly, a separate and independent step of mating the lid and container body through their hinge pieces was required. This approach adds expense and time to forming the containers, as compared to a process in which the containers are initially molded with the hinge pieces in an assembled and operative condition. Moreover, when the containers are formed of substantially ridgid plastic material, or have delicate hinge parts of very thin dimensions, the assembly operation is difficult, and can cause damage to the hinge.

U.S. Pat. No. 3,456,913, disclose a mold for use in integrally molding hinged plastic containers with the hinge pieces engaged in their operative condition. Specifically, the container disclosed in the U.S. Pat. No. 3,456,913 includes a pintle 18 of a male hinge member extending through an eye 17 of a female hinge member. The pintle 18 is generally of very thin proportions, and therefore may break if an undesirable torque is imposed upon it. Moreover, the outside diameter of the pintle is less than the inside diameter of the eye, and this structural relationship inherently follows from the mold configuration employed to form the hinge. Accordingly, the hinge includes some play in it. For some applications this loose fitting relationship between male and female hinge members may not be desired.

The mold disclosed in the U.S. Pat. 3,456,913 is somewhat complex, and includes thin wall sections which may become damaged by fragments of molded material which are inadvertently left in the mold after an injection molding operation. These fragments may cause the thin wall sections to break when the mold sections are closed for a subsequent molding operation.

The complexity of the mold disclosed in the U.S. Pat. No. 3,456,913 results from the fact that it includes core pins 34 which must be moved laterally into sliding engagement with a seat 38 provided by surfaces of upper and lower mold sections which are moved vertically with respect to each other. Accordingly, the mold requires a cam mechanism for affecting the lateral movement of the core pins as the upper and lower mold sections are moved vertically into a closed, injection molding condition. Moreover, the mold requires some retracting mechanism for withdrawing the core pins from the mold after the injection molding operation has been completed. The inclusion of the above-described camming and retracting mechanisms in a mold enhances its complexity.

The core pins 34 employed in the mold disclosed in the U.S. Pat. No. 3,456,913 include a hollow head portion 36 which, in the closed condition of the mold, tightly engages surfaces of the upper and lower mold sections which define seat 38. When the mold is in its closed condition the hollow portion of each head 36 communicates with a male hinge member forming cavity 27. The peripheral wall defining the hollow head portion 36 is quite thin. Therefore, any plastic fragments which are inadvertently left on the surfaces defining seat 38, or within the male hinge member forming cavity 27, may cause the head portion 36 to break, or otherwise become damaged, as the mold is closed to perform a subsequent injection operation. Furthermore, sliding frictional engagement between the core pins 34 and the mold seats for the pins can cause undesirable wear of the frictionally engaged surfaces.

U.S. Pat. Nos. 2,687,157 (Cowan); 2,778,533 (Savary); 2,875,472 (Marcus) and 3,013,308 (Armour) disclose single-piece, web-type hinges which are integrally injection molded with sections of an article that are to be articulated with respect to each other. The hinge arrangement disclosed in these patents, as well as the molds employed to form them, are somewhat nonanalogous to the instant invention which relates to the molding of two-piece hinges with the hinge pieces in an operative and engaged condition with respect to each other.

SUMMARY OF THE INVENTION

This invention relates to an article having two sections articulated to one another by at least one hinge. The hinge is of the ball and socket type, and includes a substantially spherical male hinge member disposed within a recess provided by a surface of a female hinge member. The female hinge member includes retaining means for confining the male hinge member within the recess while permitting rotational motion of the male hinge member within said recess. The male hinge member is a molded extension of one section of the article, and the female hinge member is a continuous molded extension of another section of the article. To the best of applicant's knowledge no one in the prior art has suggested a rigid molded article having two sections connected together by a ball and socket-type of hinge in which a female hinge member is an injection molded extension of one section, a substantially spherical male hinge member is an injection molded extension of the other section, and the male and female hinge members are in operative engagement with each other.

In a preferred embodiment of this invention the two sections of the article are articulated to one another by at least two of the above-described ball and socket-type hinges. These hinges are laterally spaced with respect to each other to provide a linear axis of rotation between the two sections.

condition to permit formation of the unique hinge of this invention.

DESCRIPTION OF THE PREFERRED EMBODIMENTS OF THE INVENTION

Figure 1:
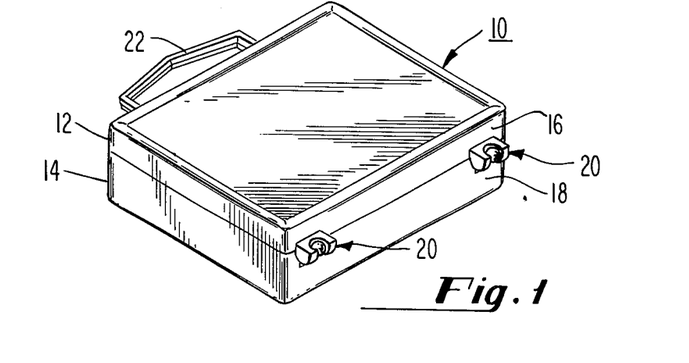
Figure 2:
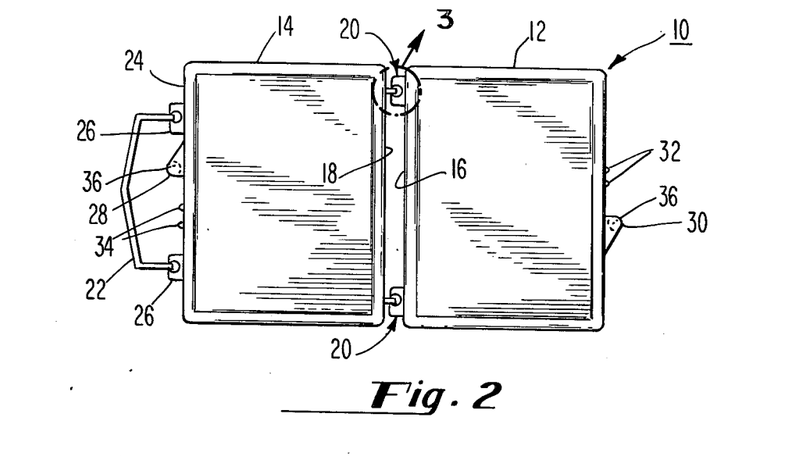

Referring to FIGS. 1 and 2, a container 10 in accordance with this invention is preferably of a rigid plastic construction, and includes a container top 12 and a container bottom 14. Rear walls 16 and 18 of the container top and container bottom, respectively, are connected together through laterally spaced hinges 20. A handle 22 is connected to a front wall 24 of the container bottom 14 through laterally spaced hinges 26, which preferably are of an identical construction to the hinges 20.

The container 10 can be secured in its closed condition shown in FIG. 1 by the frictional engagement of projections 28 and 30 provided on the front walls of container bottom 14 and container top 12, respectively, with locking ribs 32 and 34 provided on the front walls of container top 12 and container bottom 14, respectively. More specifically, each of the projections 28 and 30 is provided with a downwardly directed extension 36 which is adapted to be disposed between, and in frictional engagement with respective locking ribs. This is a well-known locking arrangement which does not require further discussion.

Figures 3, 4, 5, 6, 14, 15, 16:
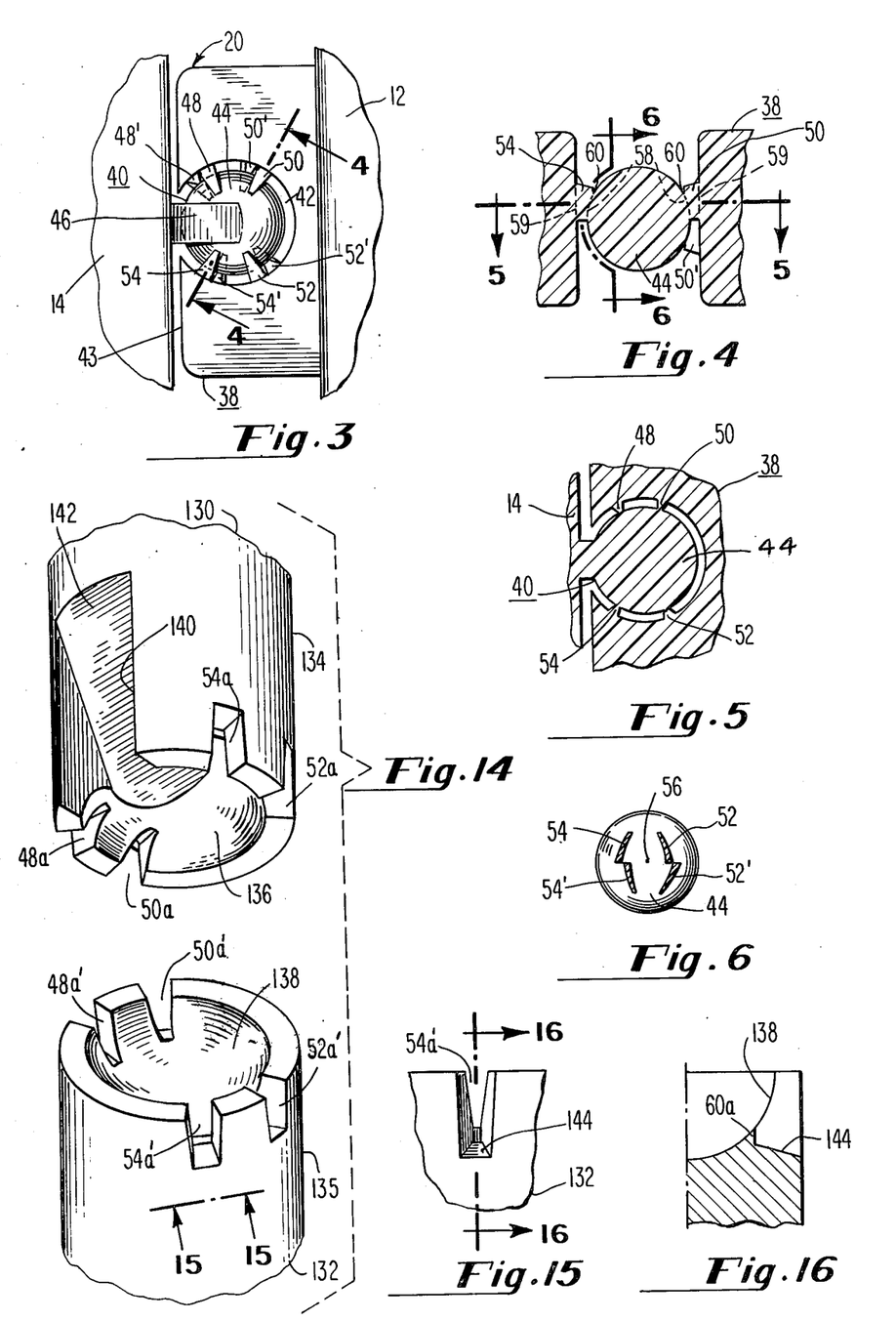
FIG. 14 is an enlarged isometric view of mold inserts employed in the upper and lower mold sections to form parts of the unique hinge of this invention.
FIG. 15 is a side elevation view along 15—15 of FIG. 14.
FIG. 16 is a sectional view along 16—16 of FIG. 15.

Referring to FIG. 3, the unique hinge 20 of this invention is of the ball and socket type, and includes a female hinge member 38 formed as an injection molded extension of the container top 12, and a male hinge member 40 formed as an injection molded extension of the container bottom 14. It should be understood that all of the hinges 20 and 26 are of an identical construction, and therefore, the description which follows will be limited to the construction of the hinge 20.

The female hinge member 38 is in the form of a socket, and includes a recess 42 extending inwardly from an outer wall 43 thereof. The male hinge member 40 has a substantially spherical member 44 disposed within the recess 42, and a support section 46 which is injection molded as a unit with the container bottom 14 and the spherical member 44. The spherical member 44 is molded within the recess 42 in a manner which will be described later.

Referring the FIGS. 3–6, two sets of ribs extend radially into the recess 42 and are injection molded extensions of the spherical member 44 and the female hinge member 38. One set of ribs 48, 50, 52 and 54 is disposed above a horizontal plane which includes the hinge axis 56 (FIG. 6). The other set of ribs 48', 50', 52',and 54' is disposed below the horizontal plane which includes the hinge axis 56. It should be understood that the number of ribs within each set can be varied. In fact, for some applications it may be possible to include only a single rib above the horizontal plane including the hinge axis 56, and single rib disposed below said horizontal plane.

Referring to FIGS. 3 and 5, each of the ribs tapers in a direction toward the spherical member 44. Accordingly, the junction 58 (FIG. 4) of each rib with the spherical 44 is narrower than the junction 59 of each rib with the curved wall defining the recess 42 in the female hinge member 38. As can be seen best in FIGS. 4 and 6, each rib also tapers in a direction away from the hinge axis 56, and the edge of each rib which is most remote from the hinge axis defines a V-notch 60 with the outer periphery of the spherical member 44.

The above-described confirguration of the ribs provides an area of high stress concentration in the region of the V-notch 60 of each rib, and this region is the thinnest section of junction 58. Accordingly, when a rotational force is applied to the container top 12 and the container bottom 14 a high stress concentration will be imposed at the junction 58 between each rib and the spherical member 44 to cause the rib to fracture at, or closely adjacent its junction with said spherical member. In order to minimize the torque required to fracture the ribs each rib in the upper set of ribs is out of alignment with each rib in the lower set. This latter arrangement can be seen best in FIGS. 3 and 6. The fractured surfaces of the ribs provide inner races which confine the spherical hinge member 44 within the recess 42 of the female hinge member 38, while permitting rotational motion between said male and female hinge members.

When laterally aligned hinges connects article sections together the torque required to fracture the ribs adjacent each spherical hinge member 44 is further minimized by positioning all of the ribs out of alignment with a plane which bisects each spherical hinge member parallel to the rotational path of the linear axis of rotation provided by the hinges. Any ribs aligned with that bisecting plane would be extremely difficult to fracture since the torque applied to them would be at a minimum.

Figure 7:
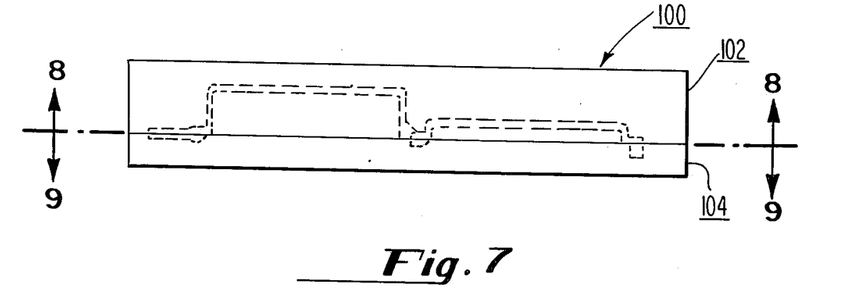

Referring to FIG. 7, a unique mold 100 in accordance with this invention includes an upper mold section 102 and a lower mold section 104. For purposes of simplicity, the sprues, gates, runners and mold supports employed with the mold 100 have been omitted. It should be understood that these omitted elements are well known to people skilled in the injection molding art, and can be easily included in the mold 100 without the exercise of any inventive skill. In the description which follows the mold regions in which parts of the container 10 are formed will be designated by the same numerals as the container parts, but with a suffix *a* thereafter.

Figure 8:
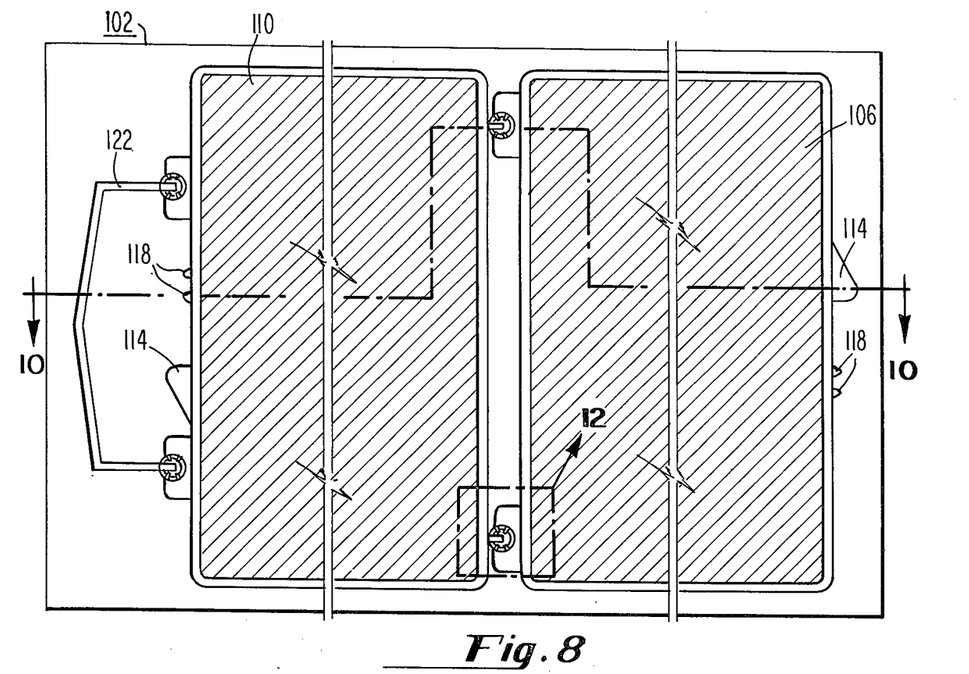
Figure 9:
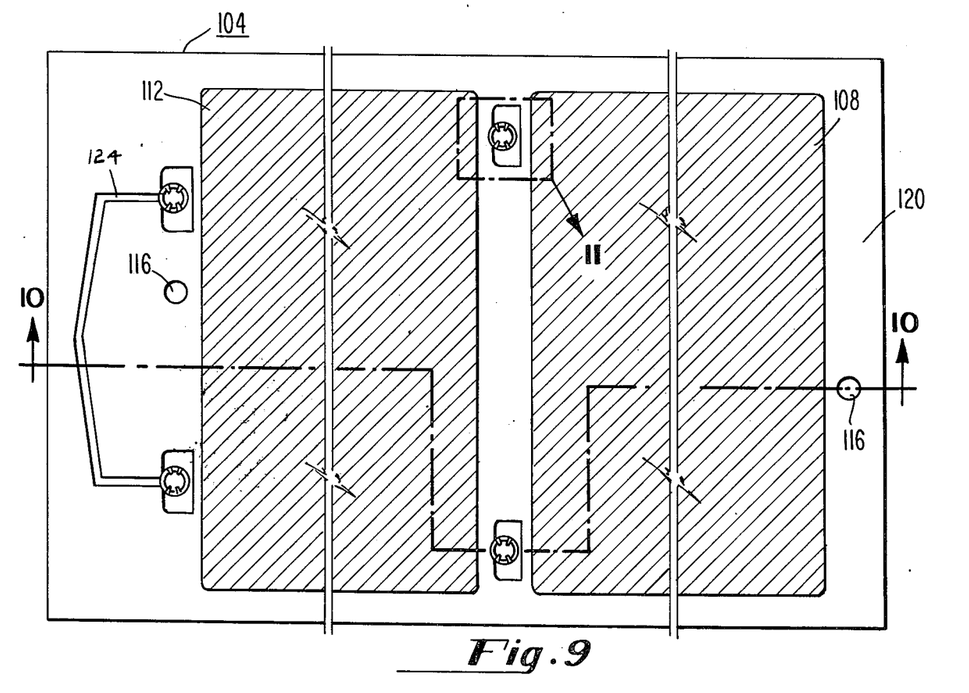
Figures 10, 11, 12, 13:
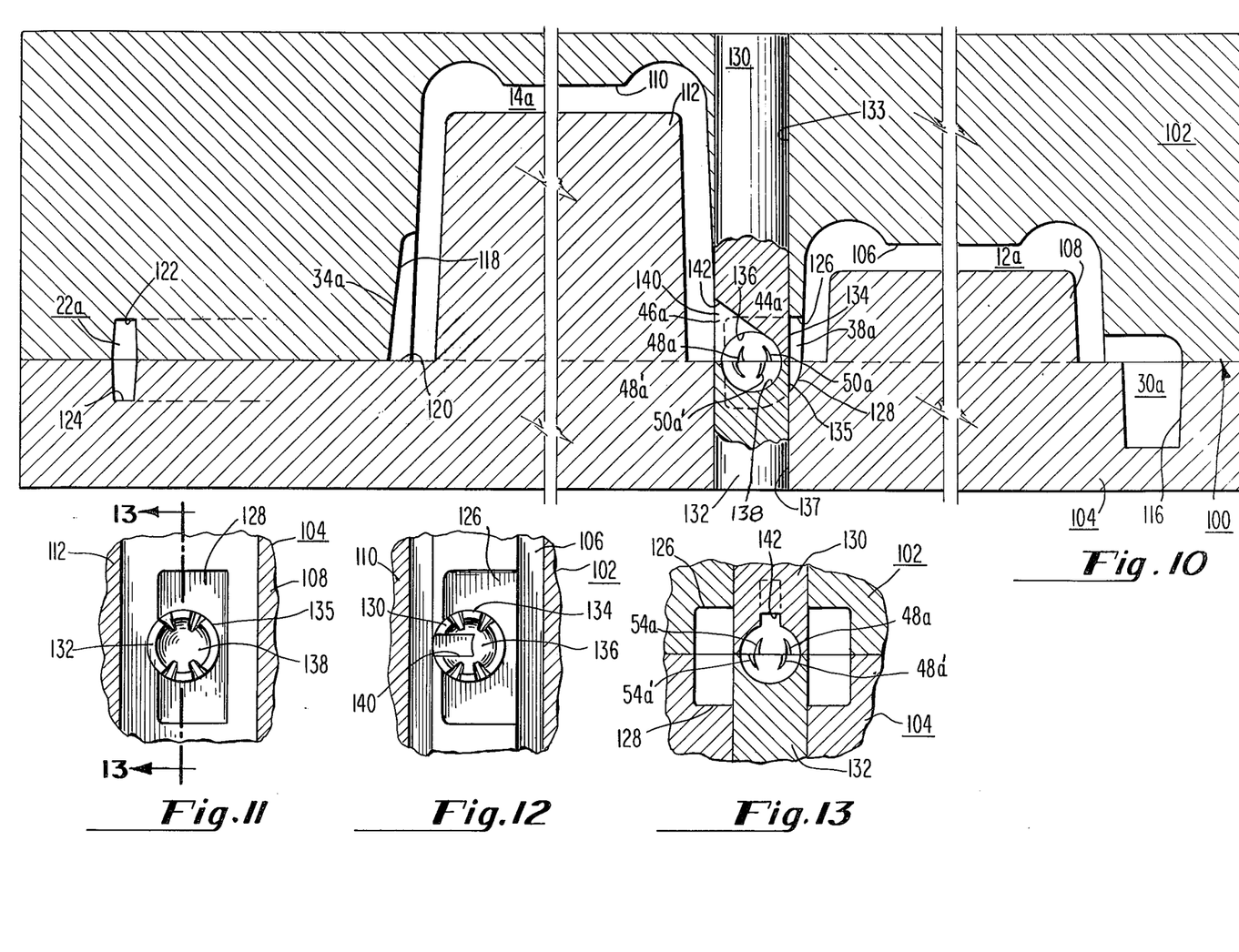
FIG. 13 is a sectional view along 13—13 of FIG. 11 with the upper and lower mold sections in a closed condition.

Referring to FIGS. 8–10 the upper mold section 102 includes a cavity 106 which cooperates with a raised projection 108 on the lower mold section 104 to define a container top forming compartment 12a. A cavity 110 in the upper mold section 102 cooperates with a riased projection 112 on the lower mold section 104 to define a container bottom forming compartment 14a. Cavities 114 in the upper mold section 102 cooperate with cavities 116 in the lower mold section 104 to define projection forming compartment 30a (FIG. 10); the extensions 36 of the projections 30 being formed in the cavities 116. Cavities 118 in the upper mold section 102 cooperate with flat mating surface 120 of the lower section 104 to define locking rib forming compartments (only one of which is shown at 34a in FIG. 10) in which the locking ribs 32 and 34 are formed. A cavity 122 in the upper mold section cooperates with a cavity 124 in the lower mold section to define a handle forming compartment 22a.

other. The ability to form more than two hinges in lateral alignment with each other in accordance with this invention exists because sections of the mold are separated by moving them in a linear direction with respect to each other. Stating this another way, the use of core pins which are required to be retracted transversely of the linear direction of movement of upper and lower mold sections are not employed in the preferred mold construction of this invention. When transversely movable core pins are employed in a mold to form hinges it is generally only possible to form two hinges in lateral alignment with each other.

The plastic materials employed in this invention preferably are thermoplastic synthetic resins such as polystyrene and vinyl resins. Most preferably the synthetic resins which are employed are of the type which are rigid after being set.

The term "rigid," as used throughout this application to describe the construction of the articles, refers to a condition wherein a molded section of the article cannot be flexed relative to itself to any significant degree without being fractured. When the female hinge member is of such a rigid construction it cannot be flexed to enlarge the dimensions of its recess for permitting the spherical male hinge member to be positioned and retained within said recess subsequent to the formation of the male and female hinge members.

Although specific details of construction had been disclosed in this application it should be understood that the claims which follow set forth what applicant regards as his invention.

I claim:

1. A mold for use in forming an article including two sections articulated to one another by at least one hinge that includes a substantially spherical male hinge member disposed within a recess provided by a surface of a female hinge member said hinge including rib means for confining the male hinge member within said recess, said mold including upper and lower mold sections which, when brought into engagement with each other, include section forming compartments for molding said article sections adjacent to one another, a female hinge member forming compartment communicating with one of the article section forming compartments, a mold segment including walls which interrupt the female hinge member forming compartment, said mold segment including inner surfaces defining a substantially spherical male hinge member forming compartment, said walls having an outer periphery which corresponds in shape to the surface of the female hinge member providing the recess therein, said walls having rib defining slots therethrough for communicating the female hinge member forming compartment with the male hinge member forming compartment, a wall of said mold segment being interrupted by an additional slot which provides a communicating passage between the other article section forming compartment and the male hinge member forming compartment.

2. The mold of claim 1 wherein the mold segment includes an upper mold insert forming a part of the upper mold section and a lower mold insert forming a part of the lower mold section, both mold inserts including an outer peripheral wall and a substantially curved surface extending inwardly from surfaces of the inserts which are mated with each other when the mold is in a closed condition, each curved surface defining a substantially hemispherical cavity in its respective insert, said hemispherical cavities being aligned with each other when the mold sections are in a closed condition to define the male hinge member forming compartment, said rib defining slots extending in an axial direction through the outer peripheral wall and mating surface of each insert for communicating the female hinge member forming compartment with the male hinge member forming compartment.

3. The mold of claim 2 wherein the axially extending slots in the upper mold insert are circumferentially offset with respect to the axially extending slots in the lower mold insert.

4. The mold of claim 3 wherein each of said rib defining slots tapers in a direction from the outer periphery of its respective insert to the inner curved surface of its respective hemispherical cavity.

5. The mold of claim 4 wherein each of said rib defining slots tapers in an axial direction from a mating surface of its respective insert to a base of said recess.

6. The mold of claim 5, wherein the base of each rib defining slot includes a substantially V-shaped projection at its junction with its respective hemispherical cavity.

7. The mold of claim 1, including at least two sets of the hinge forming compartments and slots, one set being spaced laterally from another set for providing a linear axis of rotation between two article sections formed in the mold.

8. A mold for use in forming a hinge connecting two sections of an article together, said hinge including a substantially spherical male hinge member disposed within a recess provided by a surface of a female hinge member, said hinge including rib means for confining the male hinge member within said recess, said mold including upper and lower mold sections which, when brought into engagement with each other, include a female hinge member compartment for receiving the material of the female hinge member, a mold segment including walls which interrupt the female hinge member compartment, said mold segment including inner surfaces defining a substantially spherical male hinge member compartment for receiving the material of the male hinge member, said walls having an outer periphery which corresponds in shape to the surface providing the recess of the female hinge member, said walls having rib defining slots therethrough for communicating the female hinge member compartment with the male hinge member compartment, said rib defining slots providing the regions in which the rib means of the hinge are formed.

9. The mold of claim 8 wherein the mold segment includes an upper mold insert forming a part of the upper mold section and a lower mold insert forming a part of the lower mold section, both mold inserts including an outer peripheral wall and a substantially curved surface extending inwardly from surfaces of the inserts which are mated with each other when the mold is in a closed condition, each curved surface defining a substantially hemispherical cavity in its respective insert, said hemispherical cavities being aligned with each other when the mold sections are in a closed condition to define the male hinge member compartment, said rib defining slots extending in an axial direction through the outer peripheral wall and mating surface of each insert for communicating the female hinge member compartment with the male hinge member compartment.

10. The mold of claim 9 wherein the axially extending slots in the upper mold insert are circumferentially off-